United States Patent [19]
Biagetti

[11] 3,765,943
[45] Oct. 16, 1973

[54] FABRICATION OF LEAD-ACID BATTERIES

[75] Inventor: Richard Victor Biagetti, North Plainfield, N.J.

[73] Assignee: Bell Telephone Laboratories Incorporated, Murray Hill, N.J.

[22] Filed: Dec. 9, 1970

[21] Appl. No.: 96,519

Related U.S. Application Data

[63] Continuation-in-part of Ser. No. 34,706, May 5, 1970, abandoned.

[52] U.S. Cl. .............................................. 136/27
[51] Int. Cl. .......................................... H01m 35/00
[58] Field of Search .......... 136/26–27, 75–76, 6, 9, 136/19, 67, 33–34; 23/127, 129, 146; 423/619, 434

[56] References Cited
UNITED STATES PATENTS

| | | | |
|---|---|---|---|
| 1,484,088 | 2/1924 | Schumacher | 23/127 |
| 2,249,330 | 7/1941 | Stewart | 136/26 |
| 3,244,563 | 4/1966 | Coppersmith et al. | 136/27 |
| 3,259,522 | 7/1966 | Voss et al. | 136/27 |
| 3,194,685 | 7/1965 | Malloy | 136/27 |
| 3,173,810 | 3/1965 | Voss et al. | 136/27 |
| 2,422,437 | 6/1947 | Plews | 136/27 |
| 2,658,097 | 11/1953 | Orsino | 136/27 |
| 3,084,207 | 4/1963 | Hughes et al. | 136/27 |

Primary Examiner—Anthony Skapars
Attorney—Edwin B. Cave and W. L. Keefauver

[57] ABSTRACT

Lead-acid batteries utilizing positive electrodes prepared from specific starting ingredients under critically specified conditions show improved properties in use. Such positive electrodes are prepared by oxidation of tetrabasic lead sulfate ($4PbO \cdot PbSO_4$) which in turn is prepared in accordance with certain critically specified steps. Improved properties include increased product yield, greater life, greater reproducibility in the chemical and physical properties of the product and a crystal morphology more suitable to battery operation.

8 Claims, 4 Drawing Figures

PATENTED OCT 16 1973 3,765,943
SHEET 1 OF 2

1-5 TETRABASIC LEAD SULFATE
A & B COMMERCIAL PLATES

1 - 69.4 g/in³
2 - 64.2 g/in³
3 - 66.8 g/in³
4 - 59.5 g/in³
5 - 57.2 g/in³
A - 66.2 g/in³
B - 66.2 g/in³

INVENTOR
R.V. BIAGETTI
BY
*George S. Indig*
ATTORNEY

3,765,943

FABRICATION OF LEAD-ACID BATTERIES

CROSS REFERENCE TO RELATED APPLICATIONS

This application is a continuation-in-part of a copending application, Ser. No. 34,706, filed May 5, 1970, now abandoned.

BACKGROUND OF THE INVENTION

1. Field of the Invention

The invention relates to lead-acid secondary batteries and to methods of their manufacture.

2. Description of the Prior Art

The lead-acid secondary battery while virtually ignored from the developmental and scientific standpoint for a period of several decades is among the more significant commerical devices in present use. Annual production is in the millions of units. Use is made in automobiles, in standby plant use, etc.

Until recently, lead-acid batteries in commercial use differed from those in use 25 or 50 years ago only in peripheral characteristics — hard rubber cases had been replaced by plastics, sizes and shapes had been changed to conform to modern apparatus, etc. Internally, however, the cells still utilized the same electrode structures and the electrodes were still prepared by the same empirical methods starting from a paste made by adding $H_2SO_4$ and water to a mixture of Pb and PbO (both orthorhombic and tetragonal forms) as well as other materials. Except for some relatively sophisticated uses, for example in certain trial operations in telephony, this situation continues to the present day.

The lead-acid battery is in many ways an excellent piece of apparatus which has the various attributes of economy, durability and adaptability to various types of power demand. Cell life usually measured in terms of a few years is frequently sufficient and so there has been little emphasis on engineering.

For certain uses, however, as for example for standby, characteristics have not been completely satisfactory. In this case, economic considerations are somewhat different from those applying to, for example, battery use in automobiles. Comparatively large capacities are required in standby use so that initial costs are high. But demand is rather infrequent so that battery lifetime is not usually limited by frequency of use. Thus, for standby and related uses, battery lifetime under low demand conditions is of economic importance. Lead-acid batteries are known to have a long-time gradual decrease in capacity which is an undesirable characteristic for standby and related uses.

SUMMARY OF THE INVENTION

A lead-acid battery with a positive electrode structure prepared in accordance with a critically specified procedure utilizing specific starting ingredients shows certain operating advantages over typical structures. The starting material for making the lead dioxide pellet (this is the term applied to the body of active material contained in the grid) is tetrabasic lead sulfate. This starting ingredient to produce the inventive results must be prepared from the orthorhombic modification of lead oxide. The conversion procedure from lead oxide to the sulfate is also critical and involves, inter alia, preacidification to a critical range of pH values.

The formation may be carried out in the usual manner in aqueous sulfuric acid. Acid with specific gravity between 1.001 and 1.150 is suitable for use in the formation process. More dilute acid reduces the conductivity of the solution so that undesirably high voltages are required in the formation process. There are no particular advantages to the use of more concentrated acid solutions than spcific gravity 1.150. A preferred range has been established by significant finding that formation time is shorter when more dilute acid is used. This preferred range of specific gravity is from 1.005 and 1.030. The lower limit in the preferred range is established by limited electrical conductivity of the solution referred to above.

Properties of electrodes formed in such dilute acid have been under test for some time and appear compatible to properties of electrodes formed with more concentrated acid at least for the usual commercial use. However, tests have not yet been sufficient to assure maximum life for more demanding use as for standby power sources. At this time, therefore, where longest life is required and longer formation times can be tolerated, another range of specific gravity is preferred. This preferred range of specific gravity is 1.030 to 1.070.

The resulting positive electrode is characterized by a physical durability considered to be related to a particular crystal morphology, size and gross configuration. Presumably, due to characteristics including the crystalline configuration, final cells show increased life on the basis of accelerated tests and also a lessened drop-off in capacity with time. Resultant batteries are therefore particularly appropriate for long term use (several years) and are of particular interest for standby applications.

DETAILED DESCRIPTION

1. Processing Parameters

Figure 1:
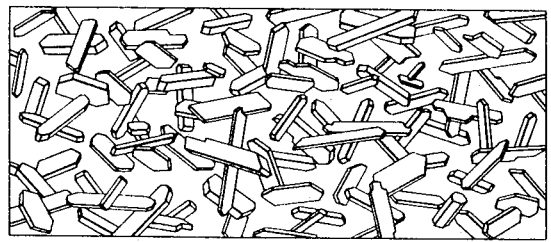
FIG. 1 is a plane view of a section of a lead dioxide pellet which serves as active material in a positive electrode of a lead-acid battery prepared in accordance with the invention.

It has been noted that the invention is critically dependent on the nature of the starting material, tetrabasic lead sulfate, from which the pellets for the positive electrodes are prepared. The preparation of this material is described in some detail:

A. It has been determined that suitable sulfate is prepared only from lead oxide material which is primarily of the orthorhombic modification. For these preparations it is considered that at least 90 percent of the PbO be of this modification. Any significant increase for example in the other prevalent modification, the tetragonal, results in final pellets which do not show the improved physical integrity or the improved operational characteristics of the inventive product.

Various impurities have different effects on the characteristics of lead-acid batteries. Particular attention must be paid to the purity of the lead oxide and sulfuric acid used in the preparation of the tetrabasic lead oxide since these impurities are likely to end up in the electrolyte or active part of the battery electrode. Thus, such impurities as silver, copper, aluminum, iron, zinc, manganese and others which have a deleterious effect on the electrochemical properties of electrolytic cells should not be present in quantities greater than 0.3 percent. Certain impurities might be included in the cell intentionally so as to improve some property such as shock resistance or porosity. For example, various metals such as antimony and calcium and others can be used to alloy the lead used to make the electrode grids in batteries. These alloying metals improve the mechanical properties of the lead and reduce electrochemical formation on the electrodes. Such impurities usually do not find their way into the electrolyte or active part of the electrode in large amounts and for this reason are more tolerable. For example, calcium, arsenic and tellurium are tolerable in lead alloys up to about one percent and antimony up to about 15 percent. Expanders are also used to keep the electrode material spongy and increase battery capacity. Such expanders consist of certain organic material and crystals of, for example, barium sulfate. These expanders are inert electrochemically and do not dissolve in the electrolyte. They can be tolerable up to about five percent. Certain other inert material such as plastic or wooden separators and other structural parts can be tolerated to about 25 percent.

For most demanding use and for particularly long life it has been found that some advantages accrue due to attention to purity. For example, while ordinary tap water certainly appears suitable, it appears that some advantages results from the use of distilled or deionized water. One such advantage is reduction of charging overvoltage. This limits the amount of charging current necessary to charge a battery to a given capacity. Since excessive charging current reduces the lifetime of the battery, increased purity extends battery lifetime, especially in float service.

B. Preparation of the sulfate is carried out in an aqueous suspension of lead oxide. Sufficient water is added to insure efficient mixing so that uniform reaction conditions are maintained throughout the process. The preferred composition is 4.5 gallons of distilled water for every 10 pounds of lead oxide. One-tenth of this amount of distilled water would make efficient mixing difficult. Ten times this amount of water would make the reaction vessel overly large and not improve the mixing efficiency significantly.

In making this suspension, the distilled water is preacidified to a pH between one and 3.5 before adding the orthorhombic lead oxide. In less acidic solutions than pH 3.5, orthorhombic lead oxide is converted to tetragonal lead oxide which leads, as stated above, to an undesirable product. The lower pH limit is set by the requirement that uniform reaction conditions be maintained. For a pH less than one, a large fraction of the sulfuric acid needed for the synthesis must be added to the distilled water before the lead oxide is added. Thus, the reaction takes place when the load oxide is added, before it is uniformly dispersed in the aqueous suspension and in the presence of excess sulfuric acid. The preferred pH is 2.

2. Processing Conditions

The reaction should be carried out at a temperature between 80° and 100° C. Below 80° C, the reaction product has too small a particle size and is composed of a mixture of compounds. Above approximately 100° C, the mixture boils. The preferred temperature range is 80°–85° C.

Efficient mixing is essential so as to maintain a uniform reaction medium. The mixing should at least be fast enough to prevent the lead oxide from settling out of the suspension but not so fast as to fragment the crystals of tetrabasic lead sulfate formed in the suspension.

The rate of addition of sulfuric acid is again controlled by the requirement that the reaction mixture remain uniform. Usually, the total amount of sulfuric acid is added over a period of one hour. Significantly shorter time could be used only if elaborate means were used to keep the reaction mixture uniform. Times as short as 10 minutes are possible under these conditions without deterioration of the reaction product. For example, the sulfuric acid can be added through many separate tubes located at different parts of the reaction vessel. Longer times are not detrimental to the reaction process but usually are wasteful of time.

A total of 0.2 moles of sulfuric acid should be added for every mole of lead oxide used. This requirement is derived from the stoichiometry of the reaction $5PbO + H_2SO_4 \rightarrow 4PbO \cdot PbSO_4 + H_2O$. Excess sulfuric acid beyond the stoichiometric amount is not required.

From the economic standpoint, it is significant that required digestion periods, i.e., the period over which the reacted materials are permitted to stand before separation, are minimal. No observable property is found to evidence any measurable improvement by extending this period beyond an hour. Even a period of one hour is conservative, satisfactory products having resulted from materials prepared by a procedure including a digestion period of as little as 15 minutes.

The positive electrode may be formed in the usual manner in aqueous sulfuric acid. The specific gravity of the acid solution should be in the range of from 1.001 to 1.150. The lower limit is determined by limited conductivity of the solution. There is no particular advantage to more concentrated solutions than the upper limit. However, as discussed in the "Summary of the Invention," there may be a preference for carrying out the formation process in one or another part of this range of specific gravity. One preferred range arises out of the significant finding that shorter times are required to completely form the positive electrode in more dilute acid. This preferred range of specific gravity is from 1.005 to 1.030. Reduced acid concentration also reduces the conductivity of the solution below a specific gravity of 1.005 and inconveniently high voltages are required to form the electrodes in a reasonable time. This is particularly inconvenient in mass production where electrodes being formed are connected in series and increased voltage limits the number of electrodes that can be formed at the same time. In addition, the formation time for the positive and negative electrodes (see companion application Yarnell Case 2, filed Dec. 9, 1970, Ser. No. 96,520, now abandoned) become equal in the lower concentration range of the acid solution. Thus, in more dilute acid solution both electrodes can be formed at the same time in already assembled battery cells.

Properties of electrodes formed in such dilute acid have been under test for some time and appear comparable to properties of electrodes formed with more concentrated acid at least for usual commercial use. However, tests have not yet been sufficient to assure maximum life for more demanding use as for standby power sources. Thus for longest life and where longer formation times can be tolerated, the preferred range of specific gravity is 1.030 to 1.070.

3. The Drawing

FIG. 1 shows a portion of a positive electrode pellet under about 500 magnification. As seen from the figure, the electrode pellet is made up of an intermeshed array of crystals. In this example, the aspect ratio is in the range of 1:50 to 1:2 and the overall length in the range of 5 to 100 microns. Optimum properties of the positive electrode have been found to be intimately related both as to aspect ratio and to overall dimensions. Aspect ratios up to 1:1000 and crystal lengths up to 1,000 microns are desirable. The invention is significantly dependent on the fact that the parameters and starting materials are so specified that the final product invariably meets these requirements.

Figure 2:
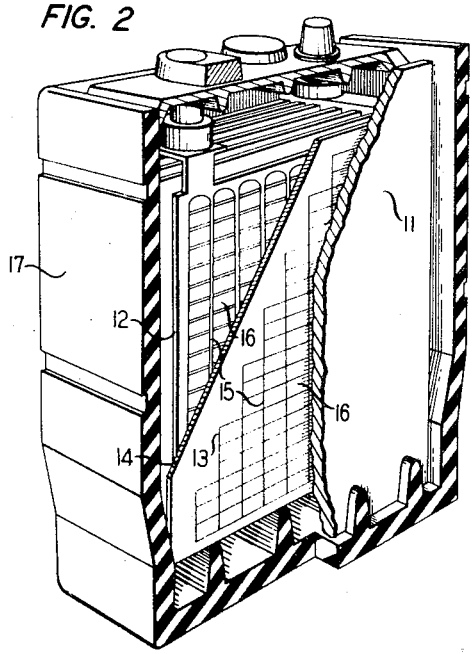
FIG. 2 is a perspective view partly in section showing a typical lead-acid battery utilizing an electrode prepared in accordance with the inventive processes.

The device of FIG. 2 is in its fundamental design one cell of a characteristic rectangular battery 10 which is made up of two or more cells separated by a partition 11. Each cell is provided with vertical positive electrodes 12 and negative electrodes 13, insulated from one another by a separator 14. Both electrodes are commonly made up of grids 15 the interstices of which are filled with pellets 16 of the active materials. In the instance of the positive electrodes, the pellets in the charged state are $PbO_2$ and for these purposes these pellets are prepared in accordance with the inventive processes. The pellets of the negative electrodes are metallic lead in the charged state. Commonly, grids utilized in structures of the type depicted, while primarily lead, contain alloying elements such as antimony and/or calcium to improve strength. Spaces within case 17 between separators 14 are filled with electrolyte which is generally aqueous sulfuric acid.

Figure 3:
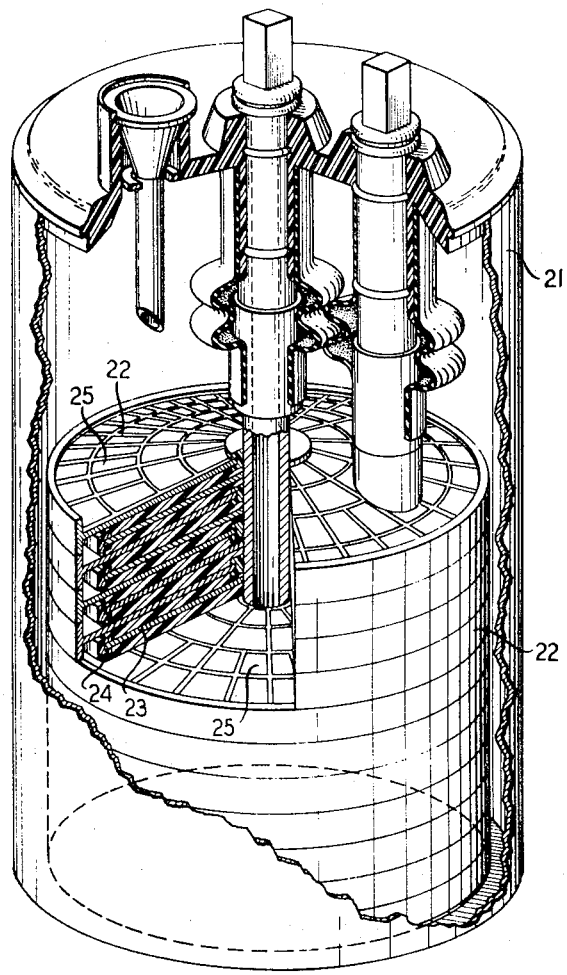
FIG. 3 is a perspective view partly in section of an alternative battery structure.

The structure of FIG. 3 is a revolutionary design currently under consideration for long term standby use. Structurally, this apparatus 20 includes an outer container 21, horizontally disposed positive electrodes 22 and negative electrodes 23 which may be conical in shape. Electronic isolation is accomplished by means of separators 24. While there are several distinguishing characteristics of engineering significance in structures of the type depicted, it is sufficient from the standpoint of this description to note that positive electrodes 22 are again made of grids which contain active pellets 25. From the inventive standpoint, such pellets are prepared in accordance with the outlined procedure.

A description of this new type of lead-acid structure and certain of its operating characteristics may be found in U. S. Pat. No. 3,434,883.

Figure 4:
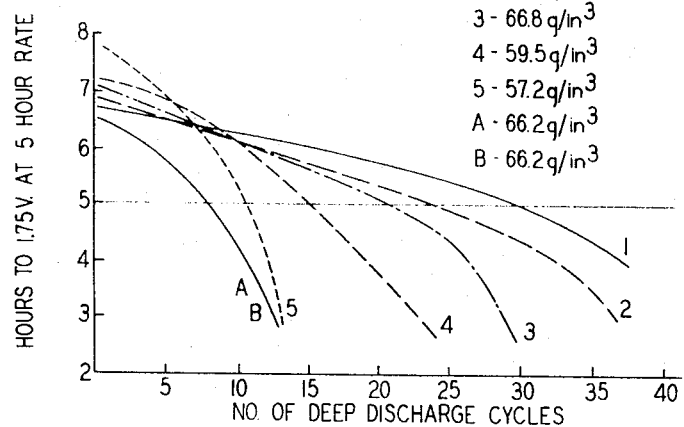
FIG. 4, on coodinates of hours to discharge a positive electrode to a voltage of 1.75 volts at a five hour rate against number of deep discharge cycles, is a plot comparing this parameter for positive electrodes made in accordance with the invention and positive electrodes made in accordance with the prior art.

In FIG. 4 data are presented in graphical form which show some of the improvements resulting from making the positive electrode in accordance with the invention. Two properties are examined, namely, initial capacity and capacity after a given amount of use.

These experiments were carried out on 2.5 × 3.0 × ¼ inch thick lead-calcium grids which were pasted with tetrabasic lead sulfate made with the process described in this disclosure. Grids were made with various paste densities or porosities so as to ascertain the effects of this property on battery capacity and battery life.

For comparison purposes, two commercial grids were obtained. Their characteristics, which were nearly identical, are plotted on one curve labeled A,B in FIG. 4. These two grids represent the characteristics of presently available positive electrodes.

In these tests the electrodes were subjected to deep discharge at a 5 hour rate once a week followed by an one hour discharge at the 5 hour rate every other working day. The 5 hour rate is a current discharge rate which under ordinary circumstances would reduce the cell voltage to 1.75 volts in 5 hours. In a deep discharge the cell is discharged to a voltage of 1.75 volts. Each discharge was followed by a hundred percent overcharge.

To some extent these tests are meant to be an approximate measure of expected battery life. This is justified by the fact that battery life is often limited by the structurel stability of the lead dioxide in the positive electrode and these tests tend to measure this structural stability in an accelerated manner.

Several results are worthy of note in FIG. 4. First, initial capacity tends to be greatest with electrodes containing the lowest density paste material. This indicates that initial capacity is increased with increasing porosity. This is consistent with the well-known theory that electrolyte diffusion is the controlling factor in initial capacity and not the quantity of lead dioxide. The data also show that the highest initial capacity plate (plate 5) also decreased in capacity the most rapidly during the test. On the other hand, the highest density material, that is, the electrode with the lowest porosity, had the lowest initial capacity but the longest life. This illustrates the fact that initial capacity can be traded off to some extent to increase capacity after extended use or battery life.

The most significant result obtained from this data is that regardless of initial capacity or lifetime the positive electrodes made from the inventive process outlasted the two commercial plates. Clearly, using the tetrabasic lead sulfate plates, either greater initial capacity or greater lifetime can be obtained. For example, using pasting densities of approximately 69 g/in³ corresponding to curve 1 a simple extrapolation would indicate that the use of the inventive process would result in approximately the same initial capacity as obtained with the commercial plates but a fourfold improvement in the structural stability of the lead dioxide mass. Greater initial capacity can be obtained by increasing the porosity of the paste as shown in curve 5. Increasing porosity reduces the lifetime of the cell but, even under these conditions, the cell made by the inventive process shows greater structural stability and lifetime than the commercial cell.

What is claimed is:

1. Process for the fabrication of positive electrodes for lead-acid batteries, said electrodes being fabricated from grids filled with paste, including the steps of reacting lead oxide in aqueous suspension with sulfuric acid at 80° to 100° C to produce tetrabasic lead sulfate, this step being the sole step of producing active lead-containing material wherein a. the lead oxide is at least 90 percent by weight the orthorhombic modification;

b. the aqueous suspension in which the reaction takes place is preacidified to a pH range of 1 to 3.5 prior to the addition of the lead oxide; and
c. the tetrabasic lead sulfate is separated from the aqueous suspension within one hour after complete addition of the sulfuric acid and filling the interstices of the said grid with a paste consisting essentially of a lead compound in the form of pure tetrabasic lead sulfate and water.

2. Process of claim 1 in which the said pH is in the range of 1.7 to 2.3.

3. Process of claim 1 in which the reaction is carried out in a temperature range from 80° to 90° C.

4. Process of claim 1 in which at least 95 percent by weight of the lead oxide is the orthorhombic modification.

5. Process of claim 4 in which essentially all of the lead oxide is of the orthorhombic modification.

6. Process of claim 1 in which the positive electrode is formed in aqueous sulfuric acid of specific gravity from 1.001 to 1.150.

7. Process of claim 6 in which the specific gravity of the aqueous sulfuric acid is from 1.005 to 1.030.

8. Process of claim 6 in which the specific gravity of the aqueous sulfuric acid is from 1.030 to 1.070.

* * * * *